United States Patent
Chang et al.

(10) Patent No.: US 11,379,722 B2
(45) Date of Patent: Jul. 5, 2022

(54) METHOD FOR TRAINING GENERATIVE ADVERSARIAL NETWORK (GAN), METHOD FOR GENERATING IMAGES BY USING GAN, AND COMPUTER READABLE STORAGE MEDIUM

(71) Applicant: HTC Corporation, Taoyuan (TW)

(72) Inventors: Edward Chang, Taoyuan (TW); Che-Han Chang, Taoyuan (TW); Chun-Hsien Yu, Taoyuan (TW); Szu-Ying Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 300 days.

(21) Appl. No.: 16/880,996

(22) Filed: May 22, 2020

(65) Prior Publication Data
US 2020/0372351 A1 Nov. 26, 2020

Related U.S. Application Data

(60) Provisional application No. 62/851,677, filed on May 23, 2019.

(51) Int. Cl.
*G06T 7/00* (2017.01)
*G06N 3/08* (2006.01)
(Continued)

(52) U.S. Cl.
CPC .............. *G06N 3/08* (2013.01); *G06F 17/18* (2013.01); *G06K 9/6267* (2013.01);
(Continued)

(58) Field of Classification Search
CPC ...... G06N 3/08; G06N 3/0454; G06N 3/0472; G06N 3/088; G06F 17/18; G06K 9/6267;
(Continued)

(56) References Cited

U.S. PATENT DOCUMENTS 10,937,540 B2 * 3/2021 Madani ............... G06N 3/0454
2019/0051057 A1 2/2019 Sommerlade et al.
(Continued)

FOREIGN PATENT DOCUMENTS

CN 108960278 12/2018
CN 109522807 3/2019

OTHER PUBLICATIONS

"Search Report of Europe Counterpart Application", dated May 14, 2021, p. 1-p. 24.
Albert Pumarola et al., "GANimation: Anatomically-aware Facial Animation from a Single Image", ICIAP: International Conference on Image Analysis and Processing, Oct. 2018, pp. 835-851.
Peng Chen et al., "Facial Attribute Editing using Semantic Segmentation", 2019 International Conference on High Performance Big Data and Intelligent Systems (HPBD&IS), May 2019, pp. 97-103.
(Continued)

*Primary Examiner* — Ping Y Hsieh
(74) *Attorney, Agent, or Firm* — JCIPRNET (57) ABSTRACT

The disclosure provides a method for training generative adversarial network (GAN), a method for generating images by using GAN, and a computer readable storage medium. The method may train the first generator of the GAN with available training samples belonging to the first type category and share the knowledge learnt by the first generator to the second generator. Accordingly, the second generator may learn to generate (fake) images belonging to the second type category even if there are no available training data during training the second generator.

20 Claims, 6 Drawing Sheets

(51) Int. Cl.
  *G06T 7/90* (2017.01)
  *G06F 17/18* (2006.01)
  *G06K 9/62* (2022.01)
  *G06N 3/04* (2006.01)

(52) U.S. Cl.
  CPC ......... *G06N 3/0454* (2013.01); *G06N 3/0472* (2013.01); *G06T 7/90* (2017.01); *G06T 2207/20081* (2013.01); *G06T 2207/20084* (2013.01)

(58) Field of Classification Search
  CPC . G06K 9/627; G06T 7/90; G06T 2207/20081; G06T 2207/20084; G06T 11/60; G06V 10/454; G06V 10/82
  See application file for complete search history.

(56) References Cited

U.S. PATENT DOCUMENTS

| | | | |
|---|---|---|---|
| 2019/0108448 A1* | 4/2019 | O'Malia | G06N 3/0472 |
| 2020/0134929 A1* | 4/2020 | Krishnamurthy | A63F 13/60 |

OTHER PUBLICATIONS

Gökhan Yildirim et al., "Disentangling Multiple Conditional Inputs in GANs", ARXIV, Jun. 2018, pp. 1-5.
Zhenliang He et al., "AttGAN: Facial Attribute Editing by Only Changing What You Want", IEEE Transactions on Image Processing, May 2019, pp. 5464-5478.
"Office Action of Taiwan Counterpart Application", dated Jan. 19, 2022, p. 1-p. 11.
Guangfeng Lin et al., "Transfer Feature Generating Networks With Semantic Classes Structure for Zero-Shot Learning," IEEE Access, vol. 7, Dec. 2019, pp. 176470-176483.
Guangfeng Lin et al., "Transfer feature generating networks with semantic classes structure for zero-shot learning", ArXiv, Jul. 2019, pp. 1-30.
Tobias Hinz et al., "Image Generation and Translation with Disentangled Representations", 2018 International Joint Conference on Neural Networks, Jul. 2018, pp. 1-8.
Oliver Blum et al., "X-GAN: Improving Generative Adversarial Networks with ConveX Combinations", Advances in Databases and Information Systems, Feb. 2019, pp. 199-214.
"Partial Search Report of Europe Counterpart Application", dated Oct. 23, 2020, pp. 1-18.

* cited by examiner

METHOD FOR TRAINING GENERATIVE ADVERSARIAL NETWORK (GAN), METHOD FOR GENERATING IMAGES BY USING GAN, AND COMPUTER READABLE STORAGE MEDIUM

CROSS-REFERENCE TO RELATED APPLICATION

This application claims the priority benefit of U.S. provisional application Ser. No. 62/851,677, filed on May 23, 2019. The entirety of the above-mentioned patent application is hereby incorporated by reference herein and made a part of this specification.

BACKGROUND OF THE INVENTION

1. Field of the Invention

The present disclosure generally relates to a generative adversarial network (GAN), in particular, to a method for training GAN, method for generating images by using a GAN, and a computer readable storage medium.

2. Description of Related Art

GANs and their variants have received massive attention in the machine learning and computer vision communities recently due to their impressive performance in various tasks, such as categorical image generation, text-to-image synthesis, image-to-image translation, and semantic manipulation. The goal of GANs or the like is to learn a generator that mimics the underlying distribution represented by a finite set of training data. Considerable progress has been made to improve the robustness of GANs.

However, when the training data does not represent the underlying distribution well, i.e., the empirical training distribution deviates from the underlying distribution, GANs trained from under-represented training data mimic the training distribution, but not the underlying one. This situation occurs because data collection is labor intensive and it is difficult to be thorough. Additionally, some modes of the underlying distribution could be missing in the training data due to insufficient quantity and in particular, diversity.

Training a GAN conditioned on category labels requires collecting training examples for each category. If some categories are not available in the training data, then it appears infeasible to learn to generate their representations without any additional information. For instance, in the task of hair recoloring (or hair color transfer), if it is desired to train an image-to-image translation model that recolors hair by rare colors such as purple, it is necessary to collect images with those hair colors. However, it is impractical to collect all possible dyed hair colors for arbitrary recoloring. Another example is that if the training data consists of only red colored roses, the GANs' discriminators would reject the other colors of roses and fail to generate roses of colors other than red. At the same time, we want to ensure that GANs will not generate a rose with an unnatural color. Therefore, to people with ordinary skills in the art, it is important to design a mechanism for improving the diversity of the training distribution to better mimic the underlying distribution.

SUMMARY OF THE INVENTION

Accordingly, the present disclosure is directed to a method for training GAN, method for generating images by using a GAN, and a computer readable storage medium for solving the above technical problems.

The disclosure provides a method for training a generative adversarial network (GAN), wherein the GAN comprises a first generator, a second generator, a discriminator and a prediction network. The method includes: receiving, by the first generator, a first random input and a first category indication and accordingly generating a first output image, wherein the first generator and the second generator are both characterized by a plurality of first neural network weightings, the first category indication indicates that the first output image corresponds to a first type category, and the first type category has available training samples; predicting, by the prediction network, a first semantic embedding vector corresponding to the first output image; generating a first comparing result by comparing the first semantic embedding vector with a second semantic embedding vector corresponding to the first type category; receiving, by the second generator, a second random input and a second category indication and accordingly generating a second output image, wherein the second category indication indicates that the second output image corresponds to a second type category; predicting, by the prediction network, a third semantic embedding vector corresponding to the second output image; generating a second comparing result by comparing the third semantic embedding vector with a fourth semantic embedding vector corresponding to the second type category; generating, by the discriminator, a discriminating result via discriminating between the first output image and at least one reference image belonging to the first type category, wherein the discriminator is characterized by a plurality of second neural network weightings; updating the second neural network weightings based on the discriminating result; updating the first neural network weightings based on the discriminating result, the first comparing result and the second comparing result.

The disclosure provides a non-transitory computer readable storage medium, recording an executable computer program to be loaded by a training system for training a generative adversarial network (GAN) including a first generator, a second generator, a discriminator and a prediction network to execute steps of: receiving, by the first generator, a first random input and a first category indication and accordingly generating a first output image, wherein the first generator and the second generator are both characterized by a plurality of first neural network weightings, the first category indication indicates that the first output image corresponds to a first type category, and the first type category has available training samples; predicting, by the prediction network, a first semantic embedding vector corresponding to the first output image; generating a first comparing result by comparing the first semantic embedding vector with a second semantic embedding vector corresponding to the first type category; receiving, by the second generator, a second random input and a second category indication and accordingly generating a second output image, wherein the second category indication indicates that the second output image corresponds to a second type category; predicting, by the prediction network, a third semantic embedding vector corresponding to the second output image; generating a second comparing result by comparing the third semantic embedding vector with a fourth semantic embedding vector corresponding to the second type category; generating, by the discriminator, a discriminating result via discriminating between the first output image and at least one reference image belonging to the first type category, wherein the discriminator is characterized by a plurality of second neural network weightings; updating the second neural network weightings based on the discriminating result; updating the first neural network weightings based on the discriminating result, the first comparing result and the second comparing result.

The disclosure provides a method for generating images by using a generative adversarial network (GAN) including a first generator and a second generator. The method includes: receiving, by the first generator, a first random input and a first category indication and accordingly generating a first output image, wherein the first generator and the second generator are both characterized by a plurality of first neural network weightings, the first category indication indicates that the first output image corresponds to a first type category, and the first type category has available training samples; predicting, by the prediction network, a first semantic embedding vector corresponding to the first output image; generating a first comparing result by comparing the first semantic embedding vector with a second semantic embedding vector corresponding to the first type category; receiving, by the second generator, a second random input and a second category indication and accordingly generating a second output image, wherein the second category indication indicates that the second output image corresponds to a second type category, and the second type category has no training samples; predicting, by the prediction network, a third semantic embedding vector corresponding to the second output image; generating a second comparing result by comparing the third semantic embedding vector with a fourth semantic embedding vector corresponding to the second type category; updating the first neural network weightings based on the first comparing result and the second comparing result.

The disclosure provides a method for training a generative adversarial network (GAN), wherein the GAN comprises a first generator, a second generator, a discriminator and a color estimator. The method includes: receiving, by the first generator, a first input image and a category indication and accordingly generating a first output image via replacing a first color of a first specific region in the first input image with a first target color, wherein the first target color belongs to a first type category having a plurality of training color samples, and the first generator and the second generator are partially characterized by a plurality of first neural network weightings; generating, by the discriminator, a discriminating result and a classification result based on the first output image; receiving, by the second generator, a second input image and a target color indication and accordingly generating a second output image via replacing a second color of a second specific region in the second input image with a second target color, wherein the second target color corresponds to the target color indication, and the second target color does not belonging to the first type category; estimating, by the color estimator, a region color corresponding to the second specific region in the second output image and generating a color comparing result by comparing the region color with the target color; generating, by the first generator, a cycle image according to the second output image and an original category indication and generating a cycle-consistency result by comparing the cycle image with the second input image; updating the discriminator based on the discriminating result and the classification result; updating the first generator and the second generator based on the discriminating result, the color comparing result, and the cycle-consistency result.

The disclosure provides a non-transitory computer readable storage medium, recording an executable computer program to be loaded by a training system for training a generative adversarial network (GAN) including a first generator, a second generator, a discriminator, and a color estimator to execute steps of: receiving, by the first generator, a first input image and a category indication and accordingly generating a first output image via replacing a first color of a first specific region in the first input image with a first target color, wherein the first target color belongs to a first type category having a plurality of training color samples, and the first generator and the second generator are partially characterized by a plurality of first neural network weightings; generating, by the discriminator, a discriminating result and a classification result based on the first output image; receiving, by the second generator, a second input image and a target color indication and accordingly generating a second output image via replacing a second color of a second specific region in the second input image with a second target color, wherein the second target color corresponds to the target color indication, and the second target color does not belonging to the first type category; estimating, by the color estimator, a region color corresponding to the second specific region in the second output image and generating a color comparing result by comparing the region color with the target color; generating, by the first generator, a cycle image according to the second output image and an original category indication and generating a cycle-consistency result by comparing the cycle image with the second input image; updating the discriminator based on the discriminating result and the classification result; updating the first generator and the second generator based on the discriminating result, the color comparing result, and the cycle-consistency result.

The disclosure provides a method for generating images by using a generative adversarial network (GAN) including a first generator and a second generator. The method includes: receiving, by the first generator, a first input image and a category indication and accordingly generating a first output image via replacing a first color of a first specific region in the first input image with a first target color, wherein the first target color belongs to a first type category having a plurality of training color samples, and the training color samples are previously used to train the first generator and the second generator; receiving, by the second generator, a second input image and a target color indication and accordingly generating a second output image via replacing a second color of a second specific region in the second input image with a second target color, wherein the second target color corresponds to the target color indication, and the second target color does not belonging to the first type category.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Roughly speaking, the method for training the GAN of the disclosure incorporates domain knowledge into the GAN framework. In the disclosure, a set of training data underrepresented at the category level, i.e., all training samples belong to the set of multiple first type categories, denoted as $Y_1$ (e.g., black, brown, blond hair color categories or red, white rose categories), while another set of multiple second categories, denoted as $Y_2$ (e.g., any other hair color categories or unavailable rose categories such as blue rose), has no training samples. The goal of the disclosure is to learn categorical image generation for both $Y_1$ and $Y_2$. To generate new data in $Y_1$, an existing GAN-based method is used to train a category-conditioned generator (which would be referred to as a first generator $G_1$) by minimizing GAN loss $L_{GAN}$ over the first generator $G_1$. To generate the second categories $Y_2$, the method of the disclosure trains another generator (which would be referred to as a second generator $G_2$) from the domain knowledge, which is expressed by a constraint function $f$ that explicitly measures whether an image has the desired characteristics of a particular category.

In brief, the concept of the method of the disclosure includes two parts: (1) constructing the domain knowledge for the task at hand, and (2) training the first generator $G_1$ and the second generator $G_2$ that condition on available and unavailable categories, respectively. The first generator $G_1$ and the second generator $G_2$ shares the neural network weightings, such that the first generator $G_1$ and the second generator $G_2$ may be coupled together and to transfer knowledge learned from the first generator $G_1$ to the second generator $G_2$. Based on the constraint function $f$; a knowledge loss, denoted as $L_K$, is further considered to train the second generator $G_2$. The general objective function of the method of the disclosure may be written as $\min_{G_1,G_2} L_{GAN}(G)+\Delta L_K(G_2)$.

Figure 1:
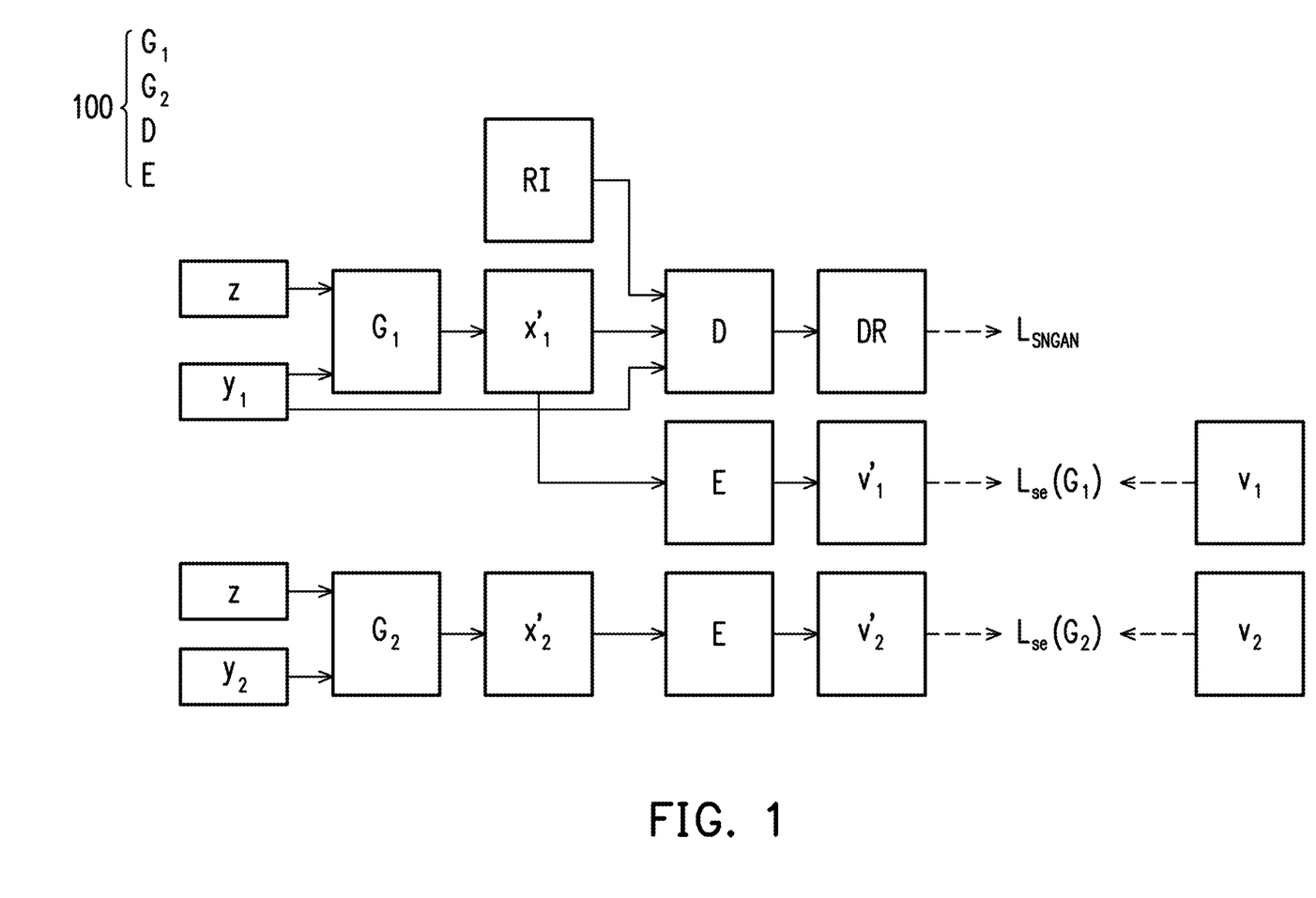
FIG. 1 is a schematic diagram illustrating the mechanism of training a GAN according to a first embodiment of the disclosure.

See FIG. 1, which is a schematic diagram illustrating the mechanism of training a GAN according to a first embodiment of the disclosure. In FIG. 1, a GAN 100 includes a first generator $G_1$, a second generator $G_2$, a prediction network E, and a discriminator D. In the first embodiment, the first generator $G_1$ and the second generator $G_2$ are both characterized by a plurality of first neural network weightings. That is, the first generator $G_1$ and the second generator $G_2$ are two generators sharing at least the first neural network weightings. In one embodiment, the first generator $G_1$ and the second generator $G_2$ are two identical generators sharing the same first neural network weightings, and hence once the first neural network weightings are updated, both of the first generator $G_1$ and the second generator $G_2$ would be updated, but the disclosure is not limited thereto.

In the first embodiment, the structure of the GAN 100 (in particular, the first generator $G_1$ and the discriminator D) is assumed to be a spectral normalization GAN (SN-GAN), and the details of the SN-GAN may be referred to "Takeru Miyato and Masanori Koyama. cgans with projection discriminator. In ICLR, 2018." and "Takeru Miyato, Toshiki Kataoka, Masanori Koyama, and Yuichi Yoshida. Spectral normalization for generative adversarial networks. In ICLR, 2018.", which would not be repeated herein.

Figure 2:
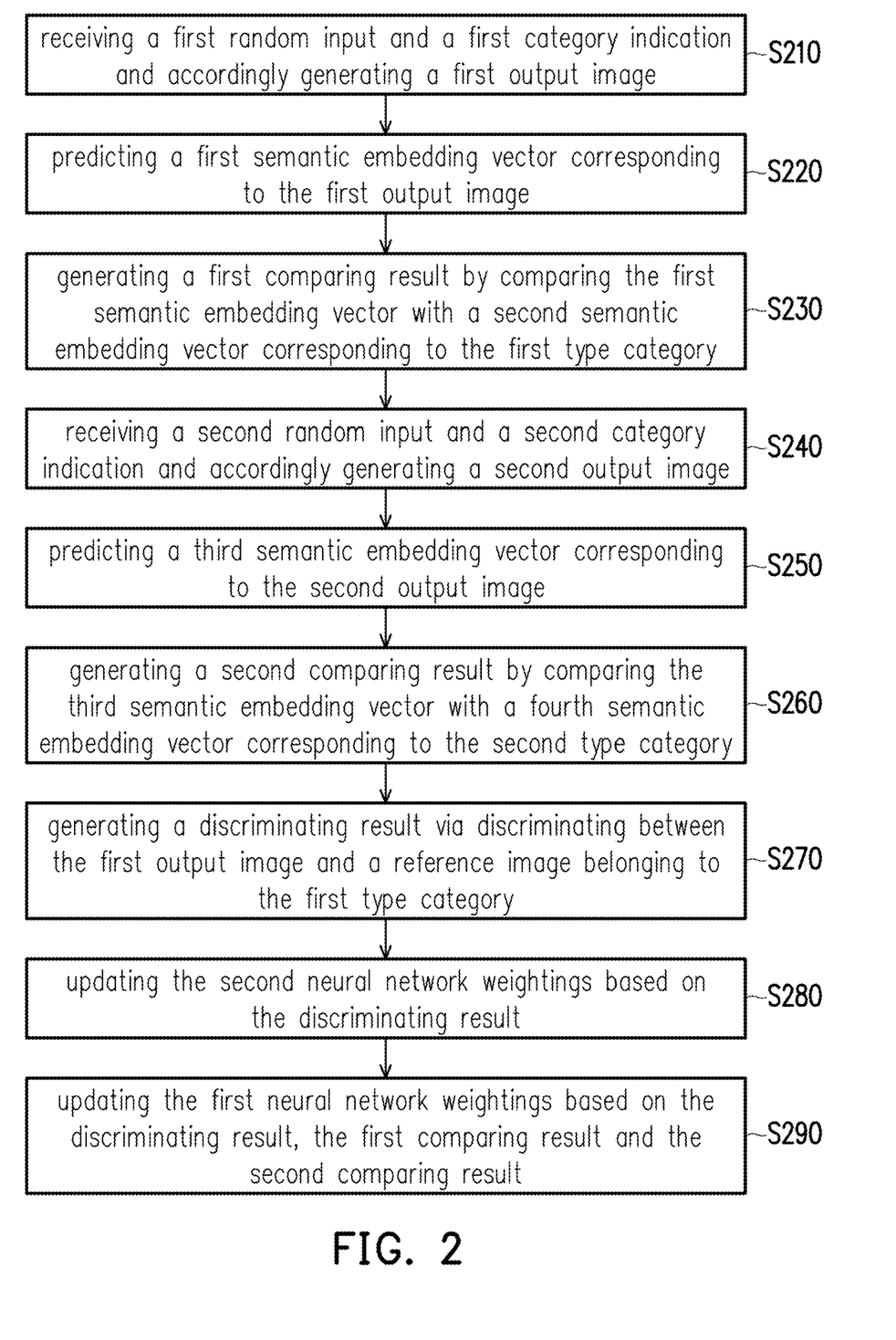
FIG. 2 shows a flow chart of a method for training the GAN according to the first embodiment of the disclosure.

See FIG. 2, which shows a flow chart of a method for training the GAN according to the first embodiment of the disclosure. In the following, details of the steps in FIG. 2 would be introduced by using FIG. 1 as an example, but the disclosure is not limited thereto. In the disclosure, the method of FIG. 2 may be performed by a training system (e.g., computer devices) used for training the GAN 100.

In step S210, the first generator $G_1$ may receive a first random input and a first category indication $y_1$ and accordingly generating a first output image $x'_1$, wherein, the first category indication indicates that the first output image $x'_1$ corresponds to a first type category (e.g., "red rose", "white rose"), and the first type category has available training samples (e.g., pictures of red/white roses). In the first embodiment, the first random input may be a random noise denoted by z.

In the first embodiment, the process performed in step S210 may be represented as $G_1z: (z, y_1) \rightarrow x_1'$. In one embodiment, the first category indication $y_1$ may be defined as a first one-hot vector indicating the first type category. For example, if the first category includes "red rose" and "white rose", the first category indication $y_1$ may be [1, 0] to indicate the "red rose" or [0, 1] to indicate the "white rose", but the disclosure is not limited thereto.

In another embodiment, the first category indication $y_1$ may be defined as a first specific semantic embedding vector indicating the first type category. For example, if the first category includes "red rose" and "white rose", the related textual descriptions related to the "red rose" may be converted to be the corresponding sentence features with the mechanism taught in "Scott Reed, Zeynep Akata, Honglak Lee, and Bernt Schiele. Learning deep representations of fine-grained visual descriptions. In *CVPR*, 2016.", and those sentence features corresponding to the "red rose" may be averaged to obtain the semantic embedding vector corresponding to "red rose". Similarly, the semantic embedding vector corresponding to "white rose" may be obtained based on the same principle, which would not be repeated herein.

In the first embodiment, the first output image $x'_1$ may be regarded as a fake image generated by the first generator $G_1$ based on the first random input (i.e., z) and the first category indication $y_1$. For example, if the first category indication $y_1$ is a first specific semantic embedding vector indicating "red rose", the first generator $G_1$ would accordingly generate a fake image of a red rose. For another example, if the first category indication $y_1$ is a first specific semantic embedding vector indicating "white rose", the first generator $G_1$ would accordingly generate a fake image of a white rose, but the disclosure is not limited thereto.

In step S220, the prediction network E may predict a first semantic embedding vector $v'_1$ corresponding to the first output image $x'_1$. In the first embodiment, the prediction network E may be an embedding regression network pretrained with the available training samples belonging to the first type category.

That is, if the prediction network E receives an image, the prediction network E may output the semantic embedding vector corresponding to the image. For example, if the prediction network E receives a red rose image, the first semantic embedding vector $v'_1$ outputted by the prediction network E would be the semantic embedding vector corresponding to "red rose". For another example, if the prediction network E receives a white rose image, the first semantic embedding vector $v'_1$ outputted by the prediction network E would be the semantic embedding vector corresponding to "white rose".

Next, in step S230, a first comparing result may be generated by comparing the first semantic embedding vector $v'_1$ with a second semantic embedding vector $v_1$ corresponding to the first type category. For example, if the first category indication $y_1$ indicates "red rose", the second semantic embedding vector $v_1$ may correspond to "red rose" as well. In addition, since the first category indication $y_1$ may be defined as the first specific semantic embedding vector indicating the first type category, the second semantic embedding vector $v_1$ may be used to define the first specific semantic embedding vector, i.e., the first category indication $y_1$ may be the same as the second semantic embedding vector $v_1$, but the disclosure is not limited thereto.

In brief, the first comparing result may be understood as related to the similarity between the first semantic embedding vector $v'_1$ and the second semantic embedding vector $v_1$. If the first generator $G_1$ generates a fake image (e.g., fake red rose image) with high quality (i.e., difficult to be identified as fake), the first semantic embedding vector $v'_1$ should be close to the second semantic embedding vector $v_1$, and vice versa.

Therefore, in the first embodiment, the first comparing result may be used to formulate a first semantic loss function $L_{se}(G_1) = E_{z,v_1} \|E(G_1(z,v_1)) - v_1\|^2$, wherein E is an expectation operator, $G_1(z, v_1)$ is the first output image $x'_1$, $E(G_1(z, v_1))$ is the first semantic embedding vector $v'_1$.

In step S240, the second generator $G_2$ may receive a second random input and a second category indication $y_2$ and accordingly generating a second output image $x'_2$, wherein the second category indication $y_2$ indicates that the second output image $x'_2$ corresponds to the second type category (e.g., "blue rose"), and the second type category has no training samples (e.g., pictures of blue roses). In the first embodiment, the second random input may be the random noise denoted by z as well for brevity.

In the first embodiment, the process performed in step S240 may be represented as $G_2:(z, y_2) \rightarrow x_2'$. In one embodiment, the second category indication $y_2$ may be defined as a second one-hot vector indicating the second type category or a second specific semantic embedding vector indicating the second type category, and the related details may be referred to the above teachings, which would not be repeated herein.

In the first embodiment, the second output image $x'_2$ may be regarded as a fake image generated by the second generator $G_2$ based on the second random input (i.e., z) and the second category indication $y_2$. For example, if the second category indication $y_2$ is a second specific semantic embedding vector indicating "blue rose", the second generator $G_2$ would accordingly generate a fake image of a blue rose, but the disclosure is not limited thereto.

In step S250, the prediction network E may predict a third semantic embedding vector $v'_2$ corresponding to the second output image $x'_2$. For example, if the prediction network E receives a blue rose image, the third semantic embedding vector $v'_2$ outputted by the prediction network E would be the semantic embedding vector corresponding to "blue rose".

Next, in step S260 a second comparing result may be generated by comparing the third semantic embedding vector $v'_2$ with a fourth semantic embedding vector $v_2$ corresponding to the second type category. For example, if the second category indication $y_2$ indicates "blue rose", the fourth semantic embedding vector $v_2$ may correspond to "blue rose" as well. In addition, since the second category indication $y_2$ may be defined as the second specific semantic embedding vector indicating the second type category, the fourth semantic embedding vector $v_2$ may be used to define the second specific semantic embedding vector, i.e., the second category indication $y_2$ may be the same as the fourth semantic embedding vector $v_2$, but the disclosure is not limited thereto.

In brief, the second comparing result may be understood as related to the similarity between the third semantic embedding vector $v'_2$ and the fourth semantic embedding vector $v_2$. If the second generator $G_2$ generates a fake image (e.g., fake blue rose image) with high quality (i.e., difficult to be identified as fake), the third semantic embedding vector $v'_2$ should be close to the fourth semantic embedding vector $v_2$, and vice versa.

Therefore, in the first embodiment, the second comparing result may be used to formulate a second semantic loss function $L_{se}(G_2) = E_{z,v_2} \|E(G_2(z,v_2)) - v_2\|^2$, wherein $G_2(z, v_2)$ is the second output image $x'_2$, $E(G_2(z, v_2))$ is the third semantic embedding vector $v'_2$.

In step S270, the discriminator D may generate a discriminating result DR via discriminating between the first output image $x'_1$ and a reference image RI belonging to the first type category, wherein the discriminator D is characterized by a plurality of second neural network weightings. In the first embodiment, the reference image RI may be a real image belonging to the first type category, e.g., a real image of red rose, and the discriminator D may be configured to discriminate between the first output image $x'_1$ (e.g., a fake image of red rose) and the reference image RI. In brief, the discriminator D may be configured to determine which of the first output image $x'_1$ and the reference image RI is fake.

Therefore, based on the teachings of SN-GAN, the discriminating result DR may be used to formulate a first loss function for training the discriminator D. In the first embodiment, the first loss function may be formulated as:

$$L_{SNGAN}^D(D) = -E_{x,v_1}[\max(0, 1 - D(x, v_1))] + E_{z,v_1}[\max(0, 1 + D(G_1(z,v_1),v_1))],$$ but the disclosure is not limited thereto.

In step S280, the second neural network weightings may be updated based on the discriminating result DR. In the first embodiment, the second neural network weightings may be updated subject to minimizing the first loss function (i.e., $L_{SNGAN}^D(D)$), and the details thereof may be referred to the teachings in SN-GAN.

In step S290, the first neural network weightings may be updated based on the discriminating result DR, the first comparing result and the second comparing result. In the first embodiment, the discriminating result DR may be further used to formulate second loss function for training the first generator $G_1$ and the second generator $G_2$. In the first embodiment, the second loss function may be formulated as: $L_{SNGAN}^G(G_1) = -E_{z,v_1}[D(G_1(z,v_1),v_1)]$, but the disclosure is not limited thereto.

Accordingly, the first neural network weightings are updated subject to minimizing a total loss function (denoted as $L^G$), wherein the total loss function is characterized by the second loss function (i.e., $L_{SNGAN}^G(G_1)$), the first semantic loss function (i.e., $L_{se}(G_1)$), and the second semantic loss function (i.e., $L_{se}(G_2)$). In one embodiment, the total loss function may be formulated as: $L^G = L_{SNGAN}^G(G_1) + \lambda_{se}(L_{se}(G_1) + L_{se}(G_2))$, wherein $\lambda_{se}$ may be a coefficient that could be configured based on the requirement of the developer, but the disclosure is not limited thereto.

After the first generator $G_1$ and the second generator $G_2$ have been trained, the first generator $G_1$ may be capable of generating fake images corresponding to the first type category (such as fake images of red roses) in the inference phase of the GAN 100. Similarly, the second generator $G_2$ may be capable of generating fake images corresponding to the second type category (such as fake images of blue roses) in the inference phase of the GAN 100.

Figure 3:
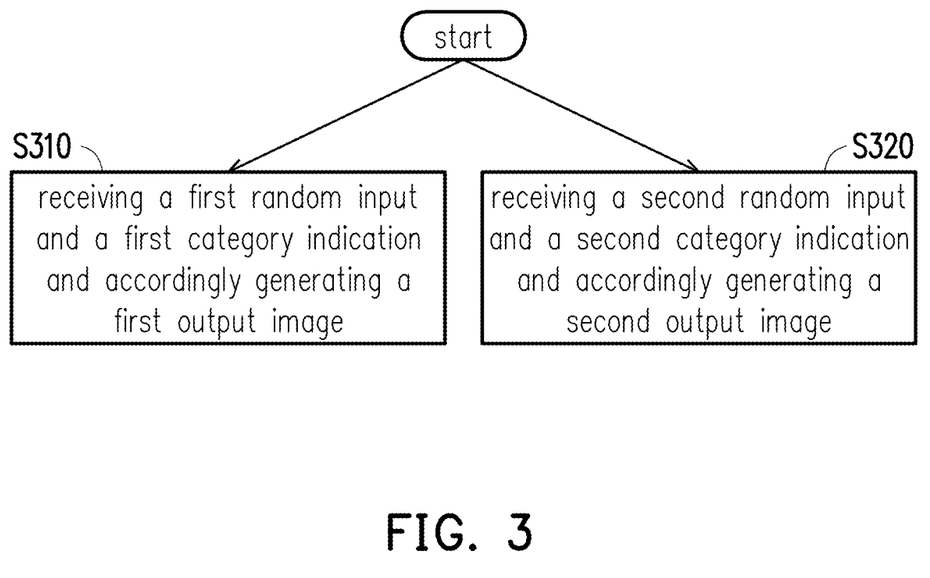
FIG. 3 shows a flow chart of a method for generating images by using GAN in the inference phase according to the first embodiment of the disclosure.

See FIG. 3, which shows a flow chart of a method for generating images by using GAN in the inference phase according to the first embodiment of the disclosure. For facilitating the following discussions, the symbols/signals in FIG. 1 would be used as examples, but the disclosure is not limited thereto.

In step S310, the first generator $G_1$ may receiving a first random input and a first category indication $y_1$ and accordingly generating a first output image $x'_1$. In step S320, the second generator $G_2$ may receive a second random input and a second category indication $y_2$ and accordingly generating a second output image $x'_2$.

As could be understood based on the above, even if there are no available training samples belonging to the second type category during the process of training the GAN 100, the second generator $G_2$ may still learn to generate images corresponding to the second type category with the method proposed in the disclosure.

In other embodiments, the disclosure further provides other ways for training a GAN, and the details thereof would be discussed along with a second embodiment in the following.

Figure 4:
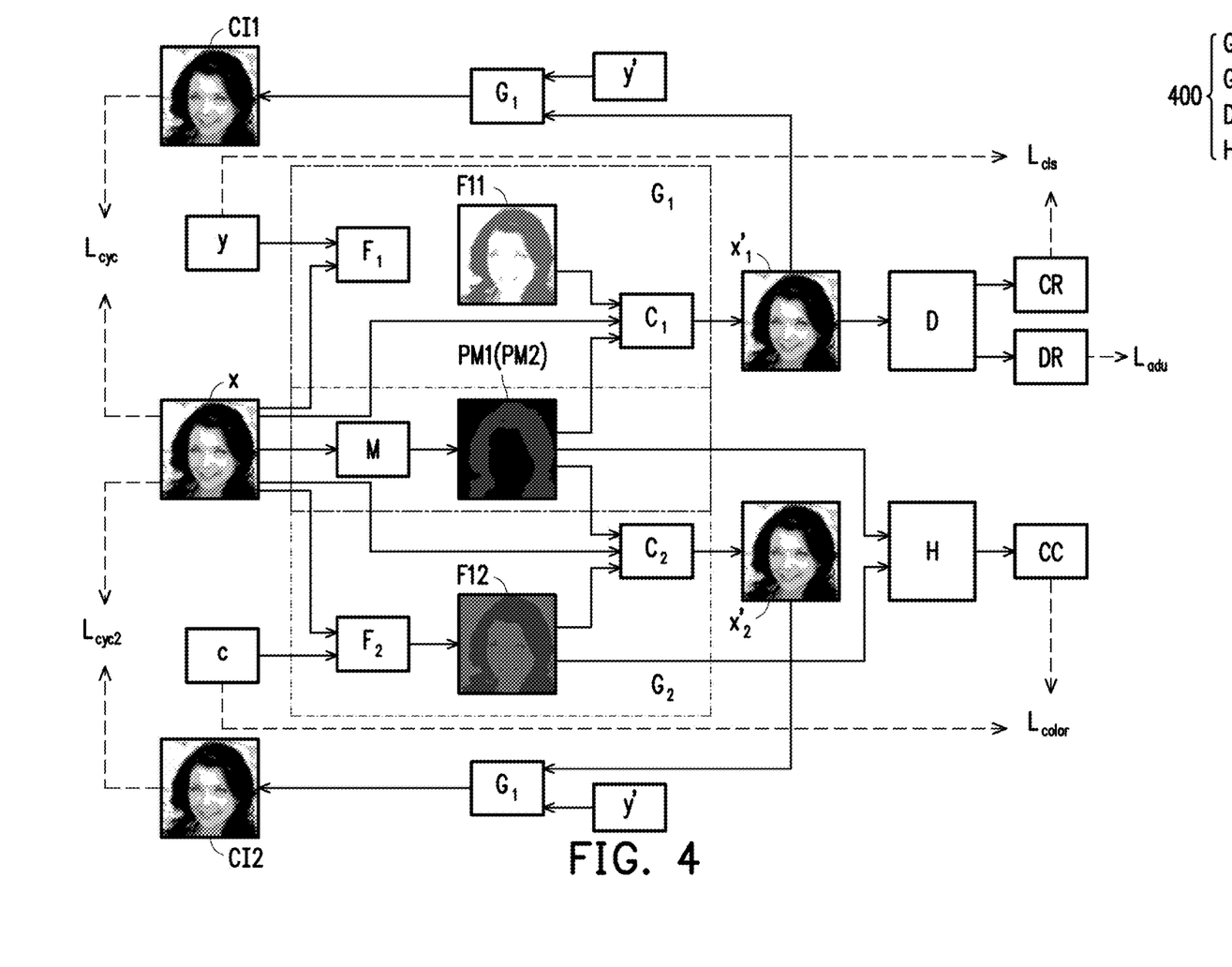
FIG. 4 is a schematic diagram illustrating the mechanism of training a GAN according to the second embodiment of the disclosure.

See FIG. 4, which is a schematic diagram illustrating the mechanism of training a GAN according to the second embodiment of the disclosure. In FIG. 4, a GAN 400 includes a first generator $G_1$, a second generator $G_2$, a color estimator H, and a discriminator D. In the second embodiment, the first generator $G_1$ and the second generator $G_2$ are partially characterized by a plurality of first neural network weightings, and the details would be introduced later.

In the second embodiment, the structure of the GAN 400 (in particular, the first generator $G_1$, the second generator $G_2$ and the discriminator D) is assumed to be a StarGAN taught in "Yunjey Choi, Minje Choi, Munyoung Kim, Jung-Woo Ha, Sunghun Kim, and Jaegul Choo. StarGAN: Unified generative adversarial networks for multi-domain image-to-image translation. In *CVPR*, 2018.", and the details may be referred thereto.

Figure 5:
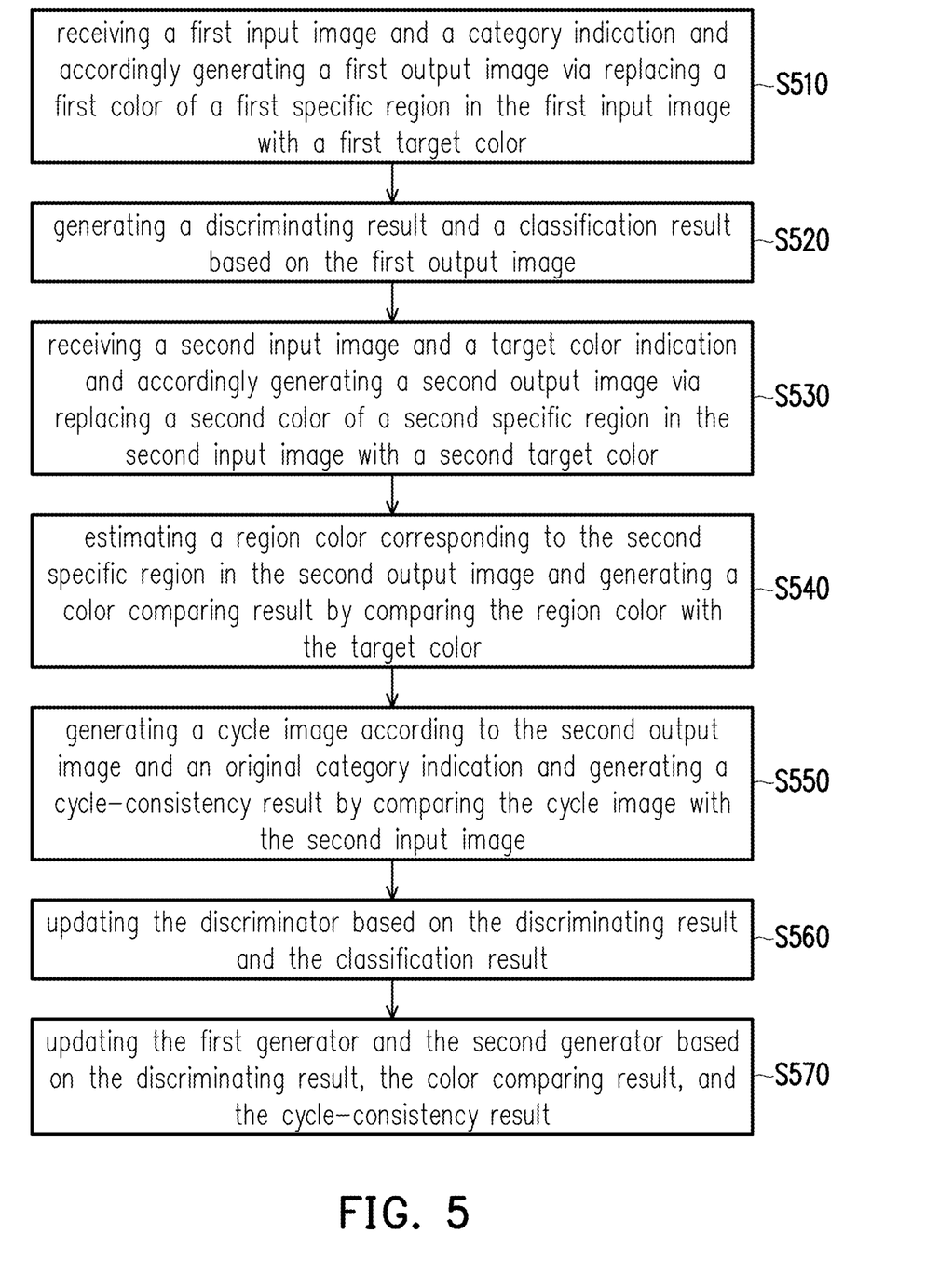
FIG. 5 shows a flow chart of a method for training the GAN according to the second embodiment of the disclosure.

See FIG. 5, which shows a flow chart of a method for training the GAN according to the second embodiment of the disclosure. In the following, details of the steps in FIG. 5 would be introduced by using FIG. 4 as an example, but the disclosure is not limited thereto. In the disclosure, the method of FIG. 5 may be performed by a training system (e.g., computer devices) used for training the GAN 500.

In step S510, the first generator $G_1$ may receive a first input image and a category indication y and accordingly generate a first output image $x'_1$ via replacing a first color of a first specific region in the first input image with a first target color, wherein the first target color belongs to the first type category having a plurality of training color samples. In the second embodiment, the first input image may be a human face image x.

For better understanding the concept of the second embodiment, the first specific region may be regarded as the hair region of the first input image (i.e., x), the first color may be regarded as the original hair color of x, the first target color may be one of the colors belong to the first type category.

For example, the first type category may be the CelebA Face dataset taught in "Ziwei Liu, Ping Luo, Xiaogang Wang, and Xiaoou Tang. Deep learning face attributes in the wild. In *ICCV*, 2015". That is, the first type category may include "black hair", "brown hair" and "blond hair", and the training color samples may include pictures of people with black/brown/blond hair, but the disclosure is not limited thereto.

That is, the first target color may be, for example, black/brown/blond. In this case, the process in step S510 may be understood as replacing, by the first generator $G_1$, the original hair color in the first input image with the first target color to generate the first output image $x'_1$, but the disclosure is not limited thereto.

In the second embodiment, the process performed in step S510 may be represented as $G_1: (x,y) \mapsto x_1'$. In one embodiment, the category indication y may be defined as a one-hot vector indicating the first type category. For example, if the first category includes "black hair", "brown hair" and "blond hair", the first category indication y may be [1, 0, 0] to indicate the "black hair", [0, 1, 0] to indicate the "brown hair" or [0, 0, 1] to indicate the "blond hair", but the disclosure is not limited thereto.

In another embodiment, the category indication y may be defined as a specific semantic embedding vector indicating the first type category. For example, if the first category includes "black hair", "brown hair" and "blond hair", the related textual descriptions related to the "black hair" may be converted to be the corresponding sentence features with the mechanism taught in "Scott Reed, Zeynep Akata, Honglak Lee, and Bernt Schiele. Learning deep representations of fine-grained visual descriptions. In *CVPR*, 2016.", and those sentence features corresponding to the "black hair" may be averaged to obtain the semantic embedding vector corresponding to "black hair". Similarly, the semantic embedding vector corresponding to "brown hair" and "blond hair" may be obtained based on the same principle, which would not be repeated herein.

In the second embodiment, the first output image $x'_1$ may be regarded as a fake image generated by the first generator $G_1$ based on the first input image (i.e., x) and the category indication y. For example, if the category indication y is a specific semantic embedding vector indicating "black hair", the first generator $G_1$ would accordingly generate a fake image of a human face with black hair. For another example, if the category indication y is a specific semantic embedding vector indicating "brown hair", the first generator $G_1$ would accordingly generate a fake image of a human face with brown hair, but the disclosure is not limited thereto.

More specifically, as shown in FIG. 4, the first generator $G_1$ includes a first convolutional neural network (CNN) $F_1$, a mask network M, and a first combiner $C_1$. In the second embodiment, the first CNN $F_1$ may generate a first foreground image FI1 (which may be formulated as $F_1(x, y)$) based on the first input image and the category indication y. The mask network M may generate a first probability map PM1 (which may be formulated as $M(x)$) corresponding to the first input image, wherein each pixel in the first probability map PM1 is labelled with a probability of corresponding to the first specific region (i.e., the probability of corresponding to the hair region). The first combiner $C_1$ may retrieve a first partial image in the first foreground image FI1 based on the first region in the first probability map, retrieve a second partial image in the first input image based on the second region in the first probability map PM1, and combining the first partial image and the second partial image as the first output image $x'_1$.

In step S520, the discriminator D may generate a discriminating result DR and a classification result CR based on the first output image $x'_1$. In the second embodiment, the discriminator D may generate the discriminating result DR via discriminating the first output image $x'_1$ with a real image belonging to the first type category. For example, if the category indication y indicates "black hair", the real image may be a real image of a human face with black hair, and the discriminator D may be configured to discriminate between the first output image $x'_1$ (e.g., a fake image of a human face with black hair) and the real image. In brief, the discriminator D may be configured to determine which of the first output image $x'_1$ and the fake is fake.

Besides, the discriminator D may predict a predicted category of the first output image $x'_1$, and the discriminator D may generate the classification result CR via comparing the predicted category with the first type category.

For example, the discriminator D may predict the category of the first output image $x'_1$ as one of "black hair", "brown hair", "blond hair". Next, the discriminator D may determine whether the predicted category matches the first type category indicated by the category indication y. The details of obtaining the discriminating result DR and the classification result CR may be referred to the teachings related to StarGAN, which would not be repeated herein.

Therefore, based on the teachings of StarGAN, the discriminating result DR and the classification result CR may be used to formulate a first loss function for training the discriminator D. In the second embodiment, the first loss function may be formulated as: $L_{StarGAN}^D = L_{adv}^D + \lambda_{cls} L_{cls}^r$, and the details thereof may be referred to the teachings related to StarGAN, which would not be repeated herein.

In step S530, the second generator $G_2$ may receive a second input image and a target color indication c and accordingly generating a second output image $x'_2$ via replacing a second color of a second specific region in the second input image with a second target color, wherein the second target color corresponds to the target color indication c, and the second target color does not belonging to the first type category. In the second embodiment, the second input image may be assumed to be the human face image x for brevity.

For better understanding the concept of the second embodiment, the second specific region may be regarded as the hair region of the second input image (i.e., x), the second color may be regarded as the original hair color of x, the second target color may be any color not belonging to the first type category. That is, the second target color is not black, brown, or blond.

In this case, the process in step S530 may be understood as replacing, by the second generator $G_2$, the original hair color in the second input image with the second target color to generate the second output image $x'_2$, but the disclosure is not limited thereto.

In the second embodiment, the process performed in step S530 may be represented as $G_2: (x,c) \rightarrow x_2'$. In addition, the target color indication c may be a 3D RGB color vector that indicates the second target color. For example, if the target color indication c is (255, 255, 255), the corresponding second target color may be white, but the disclosure is not limited thereto. That is, the second generator $G_2$ may be used to replace the original hair color of the secondi input image with any desired color corresponding to the target color indication c.

From another perspective, the second output image $x'_2$ may be regarded as a fake image generated by the second generator $G_2$ based on the second input image (i.e., x) and the target color indication c. For example, if the target color indication c corresponds to "deep purple", the second generator $G_2$ would accordingly generate a fake image of a human face with deep purple hair, but the disclosure is not limited thereto.

More specifically, as shown in FIG. 4, the second generator $G_2$ includes a second CNN $F_2$, the mask network M, and a second combiner $C_2$. The second CNN $F_2$ may generate a second foreground image FI2 (which may be formulated as $F_2(x, y)$) based on the second input image (i.e., x) and the target color indication c. The mask network M may generate a second probability map PM2 (which may be the same as the first probability map PM1 and formulated as $M(x)$) corresponding to the second input image, wherein each pixel in the second probability map is labelled with a probability of corresponding to the second specific region (i.e., the probability of corresponding to the hair region). The second combiner $C_2$ may retrieve a third partial image in the second foreground image FI2 based on the third region in the second probability map, retrieve a fourth partial image in the second input image based on the fourth region in the second probability map PM2, and combining the third partial image and the fourth partial image as the second output image $x'_2$.

In addition, as mentioned in the above, the first generator $G_1$ and the second generator $G_2$ are partially characterized by a plurality of first neural network weightings. In detail, to achieve transferring the knowledge learned from first generator $G_1$ to the second generator $G_2$, the first CNN $F_1$ and the second CNN $F_2$ partially share the first neural network weightings.

In the second embodiment, the first CNN $F_1$ may include a first NN and a second NN, wherein the first NN may convert the category indication y as a first embedding vector, and the second NN may generate the first foreground image FI1 based on the first embedding vector and the first input image.

On the other hand, the second CNN $F_2$ may include a third NN and a fourth NN, wherein the fourth NN and the third NN are both characterized by the first neural network weightings. That is, the first CNN $F_1$ and the second CNN $F_2$ are two identical NN sharing the same first neural network weightings, and hence once the first neural network weightings are updated, both of the first CNN $F_1$ and the second CNN $F_2$ would be updated, but the disclosure is not limited thereto.

In this case, the third NN may convert the target color indication c as a second embedding vector, and the fourth NN may generate the second foreground image FI2 based on the second embedding vector and the second input image $x'_2$.

In the second embodiment, to further improve the accuracy of defining the hair region, the hair recoloring process may be simplified as a simple color transfer. Specifically, it is assumed that the hair recoloring process is a spatially invariant linear transformation. Such an assumption greatly restricts process of generating the foreground images from a highly nonlinear mapping to a linear one. By doing so, the accuracy of defining the hair region may be enhanced; otherwise, a false-positive region (such as eyebrows) could be transformed into an unrealistic color and then appears in the output images. The linear transformation, parameterized by a 3×4 matrix [a|b], takes a pixel color $x_1$ as input and outputs a new color $x''_i$ by $x''_i = ax_i + b$. Such a transformation can be equivalently expressed by a 1×1 convolution as $conv_{1 \times 1}(x; [a|b])$.

In this case the first output image $x'_1$ and the second output image $x'_2$ may be formulated as:

$$x'_1 = G_1(x,y) = M(x) \otimes F_1(x,y) + (1-M(x)) \otimes x = M(x) \otimes \text{conv}_{1\times1}(x; T_1(x,y)) + (1-M(x)) \otimes x;$$

$$x'_2 = G_2(x,c) = M(x) \otimes F_2(x,c) + (1-M(x)) \otimes x = M(x) \otimes \text{conv}_{1\times1}(x; T_2(x,c)) + (1-M(x)) \otimes x;$$

wherein $\otimes$ is pixel-wise multiplication, $T_1(x,y)$ and $T_2(x,c)$ are CNNs that generate 1×1 convolutional filters.

In step S540, the color estimator H may estimate a region color (which may be represented by H(x)) corresponding to the second specific region in the second output image and generate a color comparing result CC by comparing the region color with the target color. In brief, the color estimator H may estimate the hair color in the second input image $x'_2$ (i.e., the region color) and accordingly generate the color comparing result CC.

In the second embodiment, the color estimator H may retrieve the second probability map PM2 and the second foreground image FI2 and estimate the region color via calculating a weighted average of the second foreground image FI2 weighted by the second probability map PM2.

In one embodiment, the color estimator H may include a sub-network S sharing parameters with the mask network M, and the sub-network S may be fed with the second input image (i.e., x) to generate the second probability map PM2 for the color estimator H. In one embodiment, the region color may be calculated as:

$$H(x) = \frac{\sum_i w(s_i) x_i}{\sum_i w(s_i)},$$

wherein $x_i$ and $s_i$ may be the i-th pixel of the second foreground image FI2 and the second probability map PM2, respectively. w is a weighting function that turns the probabilities of the second probability map PM2 into binary weights. w may be defined as $w(s_i) = I[s_i > 0.5 \max_j(s_j)]$, wherein I is the indicator function.

In brief, the color comparing result CC may be understood as related to the similarity between the region color and the target color. If the sub-network S generates the second probability map PM2 with high quality (e.g., the hair region is well-defined), the region color should be close to the target color, and vice versa.

Therefore, in the second embodiment, the color comparing result CC may be used to formulate a color loss function $L_{color} = E_{x,c} \| H(\text{conv}_{1\times1}(x; T_2(x,c))) - c \|_1$, but the disclosure is not limited thereto.

In step S550, the first generator $G_1$ may generate a cycle image CI2 according to the second output image $x'_2$ and an original category indication y' and generating a cycle-consistency result by comparing the cycle image CI2 with the second input image (i.e., x). Further, the first generator $G_1$ may generate another cycle image CI1 according to the first output image $x'_1$ and the original category indication y' and generating another cycle-consistency result by comparing the cycle image CI1 with the first input image (i.e., x).

As taught in StarGAN, the another cycle-consistency result may be used to regulate the first generator $G_1$ with the corresponding loss function $L_{cyc}$, and the details thereof may be referred to the teachings related to StarGAN. Based on the similar principle, the cycle-consistency result may be used as a reference for training the GAN 400.

In the second embodiment, the cycle-consistency result may be formulated as:

$$L_{cyc2} = E_{x,c,y'}[\|G_1(G_2(x,c),y') - x\|_1]$$

but the disclosure is not limited thereto.

In step S560, the discriminator D may be updated based on the discriminating result DR and the classification result CR. Specifically, the discriminator D may be characterized by the second neural network weightings, and the discriminator D may be updated via updating the second neural network weightings subject to minimizing the first loss function (i.e., $L_{StarGAN}^D = L_{adv}^D + \lambda_{cls} L_{cls}^r$).

In step S570, the first generator $G_1$ and the second generator $G_2$ may be updated based on the discriminating result DR, the color comparing result CC, and the cycle-consistency result. Specifically, the discriminating result DR, the color comparing result CR, and the cycle-consistency result are used to formulate a second loss function for training the first generator $G_1$ and the second generator $G_2$. In the second embodiment, the second loss function may be formulated as:

$$L^G = L_{StarGAN}^G(G_1) + \lambda_{color} L_{color}(G_2) + \lambda_{cyc2} L_{cyc2}(G_1, G_2)$$

wherein $\lambda_{color}$ and $\lambda_{cyc2}$ are coefficients that could be configured based on the requirement of the developer, but the disclosure is not limited thereto. Other details of the second loss function may be referred to the teachings related to the StarGAN, which would not be repeated herein. In this case, the first generator $G_1$ and the second generator $G_2$ may be updated via updating the first neural network weightings subject to minimizing the second loss function.

In addition, in the second embodiment, the mask network M may be characterized by a plurality of third neural network weightings, and the mask network M may be jointly trained with the first generator $G_1$ and the second generator $G_2$. In this case, the first generator $G_1$, the second generator $G_2$, and the mask network M may be updated via updating the first neural network weightings and the third neural network weightings subject to minimizing the second loss function, but the disclosure is not limited thereto. Since the mask network M shares parameters with the sub-network S in the color estimator, the sub-network S may be correspondingly trained, which forms a unsupervised training manner.

After the first generator $G_1$ and the second generator $G_2$ have been trained, the first generator $G_1$ may be capable of generating fake images corresponding to the first type category (such as fake images of human faces with black/brown/blond hair) in the inference phase of the GAN 400. Similarly, the second generator $G_2$ may be capable of generating fake images corresponding to the second type category (such as fake images of human faces with any desired color) in the inference phase of the GAN 400.

Figure 6:
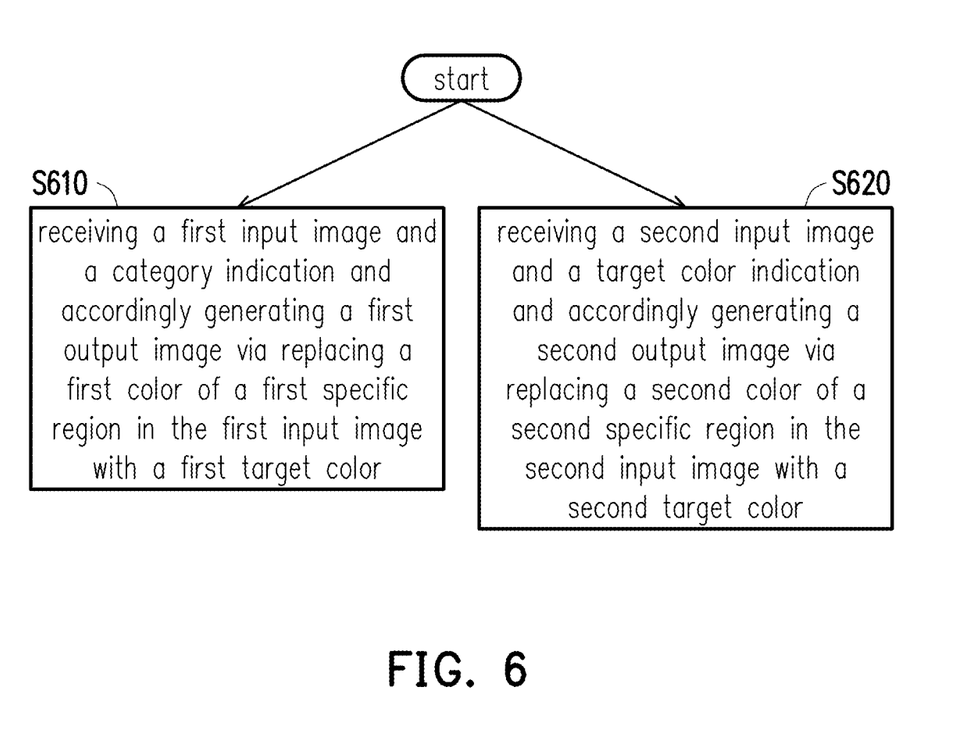
FIG. 6 shows a flow chart of a method for generating images by using GAN in the inference phase according to the second embodiment of the disclosure.

See FIG. 6, which shows a flow chart of a method for generating images by using GAN in the inference phase according to the second embodiment of the disclosure. For facilitating the following discussions, the symbols/signals in FIG. 4 would be used as examples, but the disclosure is not limited thereto.

In step S610, the first generator $G_1$ may receive a first input image (e.g., x) and a category indication y and accordingly generating a first output image $x'_1$ via replacing a first color of a first specific region in the first input image with a first target color. In step S620, the second generator $G_2$ may receive a second input image and a target color indication c and accordingly generating a second output image x'$_2$ via replacing a second color of a second specific region in the second input image with a second target color.

As could be understood based on the above, even if there are no available training samples belonging to the second type category during the process of training the GAN 400, the second generator G$_2$ may still learn to generate images corresponding to the second type category with the method proposed in the disclosure.

The present disclosure further provides a computer readable storage medium for executing method for for training a GAN. The computer readable storage medium is composed of a plurality of program instructions (for example, a setting program instruction and a deployment program instruction) embodied therein. These program instructions can be loaded into a training system (e.g., computer devices) and executed by the same to execute the method for training a GAN and the functions of the training system described above.

In summary, the method proposed in the disclosure may train the first generator of the GAN with available training samples belonging to the first type category and share the knowledge learnt by the first generator to the second generator. Accordingly, the second generator may learn to generate (fake) images belonging to the second type category even if there are no available training data during training the second generator.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for training a generative adversarial network (GAN), wherein the GAN comprises a first generator, a second generator, a discriminator, and a prediction network, comprising:
   receiving, by the first generator, a first random input and a first category indication and accordingly generating a first output image, wherein the first generator and the second generator are both characterized by a plurality of first neural network weightings, the first category indication indicates that the first output image corresponds to a first type category, and the first type category has available training samples;
   predicting, by the prediction network, a first semantic embedding vector corresponding to the first output image;
   generating a first comparing result by comparing the first semantic embedding vector with a second semantic embedding vector corresponding to the first type category;
   receiving, by the second generator, a second random input and a second category indication and accordingly generating a second output image, wherein the second category indication indicates that the second output image corresponds to a second type category;
   predicting, by the prediction network, a third semantic embedding vector corresponding to the second output image;
   generating a second comparing result by comparing the third semantic embedding vector with a fourth semantic embedding vector corresponding to the second type category;
   generating, by the discriminator, a discriminating result via discriminating between the first output image and at least one reference image belonging to the first type category, wherein the discriminator is characterized by a plurality of second neural network weightings;
   updating the second neural network weightings based on the discriminating result;
   updating the first neural network weightings based on the discriminating result, the first comparing result and the second comparing result.

2. The method according to claim 1, wherein the discriminating result is used to formulate a first loss function for training the discriminator and a second loss function for training the first generator and the second generator, and the second neural network weightings are updated subject to minimizing the first loss function.

3. The method according to claim 2, wherein the first comparing result is used to formulate a first semantic loss function, the second comparing result is used to formulate a second semantic loss function, and the first neural network weightings are updated subject to minimizing a total loss function, wherein the total loss function is characterized by the second loss function, the first semantic loss function, and the second semantic loss function.

4. The method according to claim 1, wherein the first category indication is defined as a first one-hot vector indicating the first type category or a first specific semantic embedding vector indicating the first type category.

5. The method according to claim 1, wherein the second category indication is defined as a second one-hot vector indicating the second type category or a second specific semantic embedding vector indicating the second type category.

6. The method according to claim 1, wherein the prediction network is an embedding regression network pretrained with the available training samples belonging to the first type category.

7. The method according to claim 1, wherein the second type category has no training samples.

8. A non-transitory computer readable storage medium, recording an executable computer program to be loaded by a training system for training a generative adversarial network (GAN) comprising a first generator, a second generator, a discriminator and a prediction network to execute steps of:
   receiving, by the first generator, a first random input and a first category indication and accordingly generating a first output image, wherein the first generator and the second generator are both characterized by a plurality of first neural network weightings, the first category indication indicates that the first output image corresponds to a first type category, and the first type category has available training samples;
   predicting, by the prediction network, a first semantic embedding vector corresponding to the first output image;
   generating a first comparing result by comparing the first semantic embedding vector with a second semantic embedding vector corresponding to the first type category;
   receiving, by the second generator, a second random input and a second category indication and accordingly generating a second output image, wherein the second category indication indicates that the second output image corresponds to a second type category;
   predicting, by the prediction network, a third semantic embedding vector corresponding to the second output image;

generating a second comparing result by comparing the third semantic embedding vector with a fourth semantic embedding vector corresponding to the second type category;

generating, by the discriminator, a discriminating result via discriminating between the first output image and at least one reference image belonging to the first type category, wherein the discriminator is characterized by a plurality of second neural network weightings;

updating the second neural network weightings based on the discriminating result;

updating the first neural network weightings based on the discriminating result, the first comparing result and the second comparing result.

9. A method for generating images by using a generative adversarial network (GAN) comprising a first generator and a second generator, comprising:

receiving, by the first generator, a first random input and a first category indication and accordingly generating a first output image, wherein the first generator and the second generator are both characterized by a plurality of first neural network weightings, the first category indication indicates that the first output image corresponds to a first type category;

receiving, by the second generator, a second random input and a second category indication and accordingly generating a second output image, wherein the second category indication indicates that the second output image corresponds to a second type category, and only a plurality of training samples belonging to the second type category are previously used to train the first generator and the second generator.

10. A method for training a generative adversarial network (GAN), wherein the GAN comprises a first generator, a second generator, a discriminator and a color estimator, comprising:

receiving, by the first generator, a first input image and a category indication and accordingly generating a first output image via replacing a first color of a first specific region in the first input image with a first target color, wherein the first target color belongs to a first type category having a plurality of training color samples, and the first generator and the second generator are partially characterized by a plurality of first neural network weightings;

generating, by the discriminator, a discriminating result and a classification result based on the first output image;

receiving, by the second generator, a second input image and a target color indication and accordingly generating a second output image via replacing a second color of a second specific region in the second input image with a second target color, wherein the second target color corresponds to the target color indication, and the second target color does not belonging to the first type category;

estimating, by the color estimator, a region color corresponding to the second specific region in the second output image and generating a color comparing result by comparing the region color with the target color;

generating, by the first generator, a cycle image according to the second output image and an original category indication and generating a cycle-consistency result by comparing the cycle image with the second input image;

updating the discriminator based on the discriminating result and the classification result;

updating the first generator and the second generator based on the discriminating result, the color comparing result, and the cycle-consistency result.

11. The method according to claim 10, wherein the first generator comprises a first convolutional neural network (CNN), a mask network, and a first combiner, and the method comprises:

using the first CNN to generate a first foreground image based on the first input image and the category indication;

using the mask network to generate a first probability map corresponding to the first input image, wherein each pixel in the first probability map is labelled with a probability of corresponding to the first specific region;

using the first combiner to retrieve a first partial image in the first foreground image based on the first region in the first probability map, retrieve a second partial image in the first input image based on the second region in the first probability map, and combining the first partial image and the second partial image as the first output image.

12. The method according to claim 11, wherein the mask network is characterized by a plurality of third neural network weightings, and the method further comprising:

updating the mask network via updating the third neural network weightings based on the discriminating result, the color comparing result, and the cycle-consistency result.

13. The method according to claim 11, wherein the target color indication is a 3D RGB color vector, the second generator comprises a second CNN, the mask network, and a second combiner, and the method comprises:

using the second CNN to generate a second foreground image based on the second input image and the target color indication;

using the mask network to generate a second probability map corresponding to the second input image, wherein each pixel in the second probability map is labelled with a probability of corresponding to the second specific region;

using the second combiner to retrieve a third partial image in the second foreground image based on the third region in the second probability map, retrieve a fourth partial image in the second input image based on the fourth region in the second probability map, and combining the third partial image and the fourth partial image as the second output image.

14. The method according to claim 13, wherein the first foreground image is represented as $conv_{1\times1}(x; T_1(x,y))$, the second foreground image is represented as $conv_{1\times1}(x; T_2(x, c))$, wherein x represents the first input image, y represents the category indication, c represents the target color indication, $T_1(x, y)$ and $T_2(x, c)$ are convolutional neural networks that generate 1×1 convolutional filters.

15. The method according to claim 13, comprising:

retrieving, by the color estimator, the second probability map and the second foreground image;

estimating the region color via calculating a weighted average of the second foreground image weighted by the second probability map.

16. The method according to claim 10, comprising:

generating, by the discriminator, the discriminating result via discriminating the first output image with a real image;

predicting, by the discriminator, a predicted category of the first output image;

generating, by the discriminator, the classification result via comparing the predicted category with the first type category.

17. The method according to claim 10, wherein the discriminator is characterized by a plurality of second neural network weightings, the discriminating result and the classification result are used to formulate a first loss function for training the discriminator, and the method comprises:
updating the discriminator via updating the second neural network weightings subject to minimizing the first loss function.

18. The method according to claim 10, wherein the discriminating result, the color comparing result, and the cycle-consistency result are used to formulate a second loss function for training the first generator and the second generator, and the method comprises:
updating the first generator and the second generator via updating the first neural network weightings subject to minimizing the second loss function.

19. A non-transitory computer readable storage medium, recording an executable computer program to be loaded by a training system for training a generative adversarial network (GAN) comprising a first generator, a second generator, a discriminator, and a color estimator to execute steps of:
receiving, by the first generator, a first input image and a category indication and accordingly generating a first output image via replacing a first color of a first specific region in the first input image with a first target color, wherein the first target color belongs to a first type category having a plurality of training color samples, and the first generator and the second generator are partially characterized by a plurality of first neural network weightings;
generating, by the discriminator, a discriminating result and a classification result based on the first output image;
receiving, by the second generator, a second input image and a target color indication and accordingly generating a second output image via replacing a second color of a second specific region in the second input image with a second target color, wherein the second target color corresponds to the target color indication, and the second target color does not belonging to the first type category;
estimating, by the color estimator, a region color corresponding to the second specific region in the second output image and generating a color comparing result by comparing the region color with the target color;
generating, by the first generator, a cycle image according to the second output image and an original category indication and generating a cycle-consistency result by comparing the cycle image with the second input image;
updating the discriminator based on the discriminating result and the classification result;
updating the first generator and the second generator based on the discriminating result, the color comparing result, and the cycle-consistency result.

20. A method for generating images by using a generative adversarial network (GAN) comprising a first generator and a second generator, comprising:
receiving, by the first generator, a first input image and a category indication and accordingly generating a first output image via replacing a first color of a first specific region in the first input image with a first target color, wherein the first target color belongs to a first type category having a plurality of training color samples, and the training color samples are previously used to train the first generator and the second generator;
receiving, by the second generator, a second input image and a target color indication and accordingly generating a second output image via replacing a second color of a second specific region in the second input image with a second target color, wherein the second target color corresponds to the target color indication, and the second target color does not belonging to the first type category.

* * * * *